United States Patent
Keating

(10) Patent No.: US 11,608,007 B2
(45) Date of Patent: Mar. 21, 2023

(54) VEHICLE INTERIOR MOUNTABLE AND ADJUSTABLE BOTTLE HOLDER

(71) Applicant: Clutch Side Enterprises, LLC, Ventura, CA (US)

(72) Inventor: Callan Anthony Keating, Encino, CA (US)

(73) Assignee: Clutch Side Enterprises, LLC, Ventura, CA (US)

( * ) Notice: Subject to any disclaimer, the term of this patent is extended or adjusted under 35 U.S.C. 154(b) by 0 days.

(21) Appl. No.: 17/570,341

(22) Filed: Jan. 6, 2022

(65) Prior Publication Data
US 2022/0219617 A1    Jul. 14, 2022

Related U.S. Application Data

(60) Provisional application No. 63/135,580, filed on Jan. 9, 2021.

(51) Int. Cl.
*B60R 11/00* (2006.01)
*B60R 7/08* (2006.01)

(52) U.S. Cl.
CPC ............... *B60R 11/00* (2013.01); *B60R 7/08* (2013.01); *B60R 2011/0014* (2013.01);
(Continued)

(58) Field of Classification Search
CPC ..... B60R 2011/0008; B60R 2011/0014; B60R 2011/0017; B60R 2011/0026; B60R 2011/0059; B60R 2011/0071
See application file for complete search history.

(56) References Cited

U.S. PATENT DOCUMENTS

| | | | | |
|---|---|---|---|---|
| 1,863,988 A | * | 6/1932 | Kupfer | B60N 3/083 248/312.1 |
| 4,984,722 A | * | 1/1991 | Moore | B60N 3/102 224/558 |

(Continued)

FOREIGN PATENT DOCUMENTS

| | | | | |
|---|---|---|---|---|
| CH | 705025 A2 | * | 11/2012 | ............ B60N 3/004 |
| DE | 202013003210 U1 | * | 8/2013 | ........... B60N 2/2866 |

OTHER PUBLICATIONS https://www.paulmunninstantlawn.com.au/ratchet-clamp-25mm. Last visited Mar. 25, 2019 (via the wayback machine). (Year: 2019).*

*Primary Examiner* — Scott T McNurlen
(74) *Attorney, Agent, or Firm* — Lemler IP, LLC; Thomas E. Lemler

(57) ABSTRACT

A vehicle interior mountable and adjustable bottle holder apparatus is provided having an L-shaped base, a slidably removable clip, and an adjustable elastic strap for securely holding and mounting bottles of soap, sanitizer, and similar hygienic products of various dimensions within multiple interior areas of a vehicle. The slidably removable clip is adapted for three positions; an extended, a closed, and a removed position relative to the L-shaped base. The slidably removable clip has a headrest attachment aperture or an interlocking headrest clamp, each adapted to receive and securely retain a headrest pole. In another embodiment the L-shaped base has an extruding air vent clip retention channel with air vent clips for mounting the apparatus to the vehicle's air vent. The apparatus is also adapted for insertion and retention into a side window panel in a door, attachment to an inside door handle, and an armrest of the vehicle.

18 Claims, 17 Drawing Sheets

(52) U.S. Cl.
CPC ............... *B60R 2011/0017* (2013.01); *B60R 2011/0059* (2013.01); *B60R 2011/0071* (2013.01)

(56) References Cited

U.S. PATENT DOCUMENTS

| | | | | |
|---|---|---|---|---|
| 5,553,345 | A * | 9/1996 | Bell | A45F 5/02 |
| | | | | 248/668 |
| 7,484,809 | B2 * | 2/2009 | Hughes | B60N 2/783 |
| | | | | 296/153 |
| 9,102,276 | B1 * | 8/2015 | Virgin | B60R 7/043 |
| 10,850,656 | B2 | 12/2020 | Garcia Salgado et al. | |
| 2005/0045681 | A1 * | 3/2005 | Hancock | B60R 11/0205 |
| | | | | 224/420 |
| 2018/0370428 | A1 | 12/2018 | Umeda et al. | |
| 2019/0291656 | A1 * | 9/2019 | Chou | B60R 11/0235 |
| 2020/0130604 | A1 | 4/2020 | MacNeil et al. | |
| 2022/0250554 | A1 * | 8/2022 | Skelton | B60R 11/0241 |

* cited by examiner

VEHICLE INTERIOR MOUNTABLE AND ADJUSTABLE BOTTLE HOLDER

CROSS REFERENCE TO RELATED APPLICATIONS

This application claims priority to and the benefit of U.S. Provisional Patent Application No. 63/135,580, filed Jan. 9, 2020, which is incorporated herein by reference.

BACKGROUND OF THE INVENTION

The present invention pertains to a vehicle mountable hygienic product holder apparatus for holding numerous sized and shaped bottles. The present invention further pertains to an apparatus containing an adjustable elastic strap designed to be mounted to or otherwise affixed to several interior parts of a vehicle and is intended to safely and securely hold bottles of soap, sanitizer, and similar hygienic products of a wide variety of shapes and sizes inside of a vehicle.

DESCRIPTION OF THE RELATED ART

Quick and convenient access to sanitizer products has recently become an extremely important part of the public's daily lives. Having quick and easy access to hand sanitizers, soaps, and other hygienic products in a vehicle can increase the safety and health of the general public without having to struggle to find such products before and after interacting with others or forgetting to do so altogether.

Cup holders have been available in the market for quite some time. Existing cup holders are available in a multitude of various shapes and sizes, all of which have the basic utility of temporarily holding a drink bottle or beverage container for human consumption. There have also been many variations of cup holders that can be mounted inside a vehicle, typically with a mechanism to affix the cup holder to a dashboard or lower console near the gearshift and/or seat bottoms with the same basic utility.

When members of the public perform activities outside the home, the most common means of doing so is via vehicular transportation. On average, members of the public spend 8 hours and 22 minutes in their cars per week as they carry out all of the activities that make up their daily lives. When they arrive at their destinations, they leave the car to carry out such activities and public interactions, and when completed there is a consistent and virtually guaranteed common theme: returning to their vehicle on the way back home. Therefore, the vehicle is almost always the first place a person will be immediately after such public activities and interactions. It is therefore of critical importance that a person sanitizes, disinfects, or otherwise washes their hands to remove all germs or contaminations from the "outside world" immediately upon entering the car to reduce the risk of infection, sickness, or spread of contamination.

While the imperative nature of maintaining hygiene has been spurred by the immediate threat of COVID-19, its importance will remain significant even after a return to "normalcy" is attained. Washing hands, sanitizing, disinfecting, and otherwise preserving hygiene are the "new normal." These basic actions are critical for all humans to preserve health and reduce the risk of various infections and sickness, whether it be COVID-19, the Flu, the common cold, or otherwise. Perhaps the greatest risk of contamination is performing any activity outside the home, whether it is running errands, dining out, going to a park, visiting a friend's house, or venturing out anywhere else in public where foreign objects, fixtures, or people are interacted with. It is the goal of the present invention to use preexisting infrastructure and minimal components to establish a new way to maintain personal hygiene and cleanliness by way of washing and/or sanitizing one's hands regularly throughout the day, and particularly after activities outside the home.

U.S. Pat. No. 10,850,656B2 discloses a wireless inductive charging retractable cup holder displaced between a home position, recessed and nested within a base, and a deployed position, overlying the base, for stably supporting the side of a tall drink cup, drink bottle, can or other items.

U.S. Patent Application Publication 2018/0370428A1 discloses a cup holder which includes first and second concave housing portions to house a cup, and a light source to illuminate bottom portions of the first and second housing portions. The cup holder is configured such that light emitted from the light source provides an illuminance of the bottom portion of the first housing portion that is more than an illuminance of the bottom portion of the second housing portion.

U.S. Patent Application Publication 2020/0130604A1 discloses a vehicle cup holder cell phone mount which has a base with a downwardly and inwardly tapering surface of rotation around a vertical axis. A pier stands up from a top of the base and a cell phone mounting bracket is pivotally mounted to the pier. The user wedges the cell phone mount assembly into the vehicle cup holder such that compressive force between the outermost tapering surface and the cup holder side wall securely holds the cell phone mount in place in the vehicle cup holder.

All aforementioned patents and publications are incorporated herein by reference.

While these devices may be suitable for the particular purpose employed, they would not be as suitable, or suitable at all, for the purposes of the present invention as disclosed hereafter.

While the prior art discloses various devices and apparatuses for holding beverage containers and cell phones within a vehicle, the present invention implements the use of an adjustable elastic strap as well as various mounting and attachment options, which are specifically designed for bottles of sanitizer and hygienic products, rather than beverages or cell phones. This is advantageous because the adjustable elastic strap can accommodate a variety of bottle shapes and sizes and the various mounting and attachment options provide a user with the ability to affix the apparatus to virtually any part of the vehicle, particularly in locations which are most practical for purposes of access to sanitation, hygiene, and cleanliness for people inside of a vehicle.

SUMMARY OF THE INVENTION

It is one prospect of the present invention to provide a novel system to maintain personal hygiene and cleanliness by way of utilizing a convenient and adaptable apparatus within a vehicle for washing and/or sanitizing one's hands regularly throughout the day, and particularly after activities outside the home.

The following presents a simplified summary of the present disclosure in a simplified form as a prelude to the more detailed description that is presented herein.

Therefore, in accordance with a preferred embodiment of the present invention, there is provided a vehicle interior mountable and adjustable bottle holder apparatus. The vehicle interior mountable and adjustable bottle holder apparatus has an L-shaped base, a slidably removable clip, and an adjustable elastic strap adapted to retain bottles of different shapes and sizes. The adjustable elastic strap includes an elastic strap clip to accommodate the different shapes and sizes of bottles and to securely and tightly hold those bottles in place while a vehicle is in motion, accelerating, braking, enduring bumps, and related forcible movements. In accordance with the present invention, the L-shaped base has a front base surface that is opposite a back base surface and at least two adjustable strap apertures therethrough that are adapted to receive the adjustable elastic strap. The L-shaped base further includes a horizontal base portion that is opposite a rounded base top portion which are arranged between the front base surface and the back base surface. The rounded base top portion forms a clip attachment retention channel that contains a centrally disposed clip aperture. The centrally disposed clip aperture is adapted to hold and retain the slidably removable clip, which includes a headrest attachment aperture that is adapted to receive a pole of a headrest of the vehicle therethrough. The slidably removable clip has a flexible triangular attachment clip that has a front tongue surface, which includes at least one set of raised inclined gripper members that are oriented horizontally and are equally distributed along the front tongue surface. The at least one set of raised inclined gripper members are oriented above an inclined gripper anchor member of the front tongue surface. The present embodiment of the invention includes a cylindrical retention member extending from and affixed along the slidably removable clip. When the cylindrical retention member slidably engages the clip attachment retention channel thereby retaining the slidably removable clip in an extended position from the L-shaped base. When the front tongue surface of the slidably removable clip is flush against the back base surface of the L-shaped base the slidably removable clip is retained in a closed position, and when the slidably removable clip disengages from the centrally disposed clip aperture, the slidably removable clip is in a removed position from the L-shaped base.

In one embodiment, the vehicle interior mountable and adjustable bottle holder apparatus further includes an extruding air vent clip retention channel which is centrally oriented and formed along the back base surface of the L-shaped base. The extruding air vent clip retention channel is adapted to slidably receive and retain at least two air vent clips when the slidably removable clip is in the removed position.

In another embodiment, the adjustable elastic strap is made of Velcro®.

In yet another embodiment, when the slidably removable clip is in the extended position, the flexible triangular attachment clip is adapted to be inserted into and retained by a side window panel in a door of a vehicle.

In one embodiment, when the slidably removable clip is in the extended position, the flexible triangular attachment clip is adapted to be attached to an inside door handle of a door of a vehicle.

In another embodiment, when the slidably removable clip is in the extended position, the flexible triangular attachment clip is adapted to be attached to an armrest of a vehicle.

In another preferred embodiment of the invention, a vehicle interior mountable and adjustable bottle holder apparatus is presented. The vehicle interior mountable and adjustable bottle holder apparatus includes an L-shaped base having a front base surface that is opposite a back base surface and a horizontal base portion that is opposite a rounded base top portion. Such embodiment includes an extruding air vent clip retention channel, which is centrally disposed and formed along the back base surface of the L-shaped base. The extruding air vent clip retention channel is adapted to slidably receive and retain at least two air vent clips. A clip attachment retention channel is formed on the rounded base top portion and contains a centrally disposed clip aperture, which is adapted to hold and retain a slidably removable clip. The slidably removable clip includes a headrest attachment aperture, which is adapted to receive a pole of a headrest of a vehicle therethrough. The slidably removable clip also includes a flexible triangular attachment clip, which has a front tongue surface having at least one set of raised inclined gripper members that are oriented horizontally and are equally distributed along the front tongue surface. The at least one set of raised inclined gripper members are oriented above an inclined gripper anchor member of the front tongue surface. A cylindrical retention member extends from and is affixed along the slidably removable clip. When the cylindrical retention member slidably engages the clip attachment retention channel, the slidably removable clip is retained in an extended position from the L-shaped base. When the front tongue surface of the slidably removable clip is flush against the back base surface of the L-shaped base, the slidably removable clip is retained in a closed position. When the slidably removable clip disengages from the centrally disposed clip aperture, the slidably removable clip is in a removed position from the L-shaped base. Such embodiment of the invention also includes at least two adjustable strap apertures, which are oriented through the front base surface. Each of the at least two adjustable strap apertures are adapted to receive an adjustable elastic strap. The adjustable elastic strap includes an elastic strap clip, which is adapted to adjust the adjustable elastic strap in order to secure bottles of varying shapes and sizes.

In one embodiment, the adjustable elastic strap is made of Velcro®.

In another embodiment, when the slidably removable clip is in the extended position, the flexible triangular attachment clip is adapted for insertion and retention into a side window panel in a door of a vehicle.

In yet another embodiment, when the slidably removable clip is in the extended position, the flexible triangular attachment clip is adapted for attachment to an inside door handle of a door of a vehicle.

In one embodiment, when the slidably removable clip is in the extended position, the flexible triangular attachment clip is adapted to be attached to an armrest of a vehicle.

In another embodiment, the L-shaped base and the at least two air vent clips are adapted to be attached to an air vent of a vehicle when the slidably removable clip is in the removed position.

In accordance with yet another preferred embodiment of the invention, a vehicle interior mountable and adjustable bottle holder apparatus is presented. The vehicle interior mountable and adjustable bottle holder apparatus includes an L-shaped base, a slidably removable clip, an adjustable elastic strap, which is adapted to retain bottles of different shapes and sizes, and an elastic strap clip that is adapted to receive the adjustable elastic strap. The L-shaped base has a front base surface that is oriented opposite a back base surface, and contains at least two adjustable strap apertures therethrough. Each of the at least two adjustable strap apertures are adapted to receive the adjustable elastic strap. The L-shaped base also includes a horizontal base portion that is oriented opposite a rounded base top portion, which are positioned between the front base surface and the back base surface. The rounded base top portion forms a clip attachment retention channel that contains a centrally disposed clip aperture, which is adapted to hold and retain the slidably removable clip. In such embodiment, the slidably removable clip includes an interlocking headrest clamp, which is adapted to receive and securely retain a pole of a headrest of a vehicle therethrough. The interlocking headrest clamp has a first interlocking member and a second interlocking member, which form an open-ended band in a relaxed position. The first interlocking member has an upper tongue positioned opposite a lower jaw, which forms a first elongated open-ended cavity and a first row of clamping teeth are formed on an inner surface of the lower jaw. The second interlocking member has an upper jaw positioned opposite a lower tongue, which forms a second elongated open-ended cavity and a second row of clamping teeth, which are formed on an inner surface of the upper jaw. The first interlocking member slidably engages with the second interlocking member in a locking position. Such preferred embodiment includes a flexible triangular attachment clip that has a front tongue surface, which includes at least one set of raised inclined gripper members that are oriented horizontally and are equally distributed along the front tongue surface. The at least one set of raised inclined gripper members are oriented above an inclined gripper anchor member of the front tongue surface. A cylindrical retention member extends from and is disposed along the slidably removable clip. When the cylindrical retention member slidably engages the clip attachment retention channel, the slidably removable clip is retained in an extended position from the L-shaped base. When the front tongue surface of the slidably removable clip is oriented flush against the back base surface of the L-shaped base, the slidably removable clip is in a closed position. When the slidably removable clip is disengaged from the centrally disposed clip aperture, the slidably removable clip is in a removed position from the L-shaped base.

In one embodiment, the vehicle interior mountable and adjustable bottle holder apparatus further includes an extruding air vent clip retention channel, which is centrally oriented on and formed along the back base surface of the L-shaped base. The extruding air vent clip retention channel is adapted to slidably receive and retain at least two air vent clips when the slidably removable clip is in the removed position.

In another embodiment, the adjustable elastic strap is made of Velcro®.

In yet another embodiment, when the slidably removable clip is in the extended position, the flexible triangular attachment clip is adapted to be inserted into and retained by a side window panel in a door of a vehicle.

In one embodiment, when the slidably removable clip is in the extended position, the flexible triangular attachment clip is adapted to be attached to an inside door handle of a door of a vehicle.

In another embodiment, when the slidably removable clip is in the extended position, the flexible triangular attachment clip is adapted to be attached to an armrest of a vehicle.

BRIEF DESCRIPTION OF THE DRAWINGS

Illustrative embodiments of the present invention are described herein with reference to the accompanying drawings, in which.

DETAILED DESCRIPTION

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Referring initially to FIGS. 1-8, the basic constructional details and principles of operation of a vehicle interior mountable and adjustable bottle holder apparatus 100 according to a preferred embodiment of the present invention will be discussed.

Figure 1:
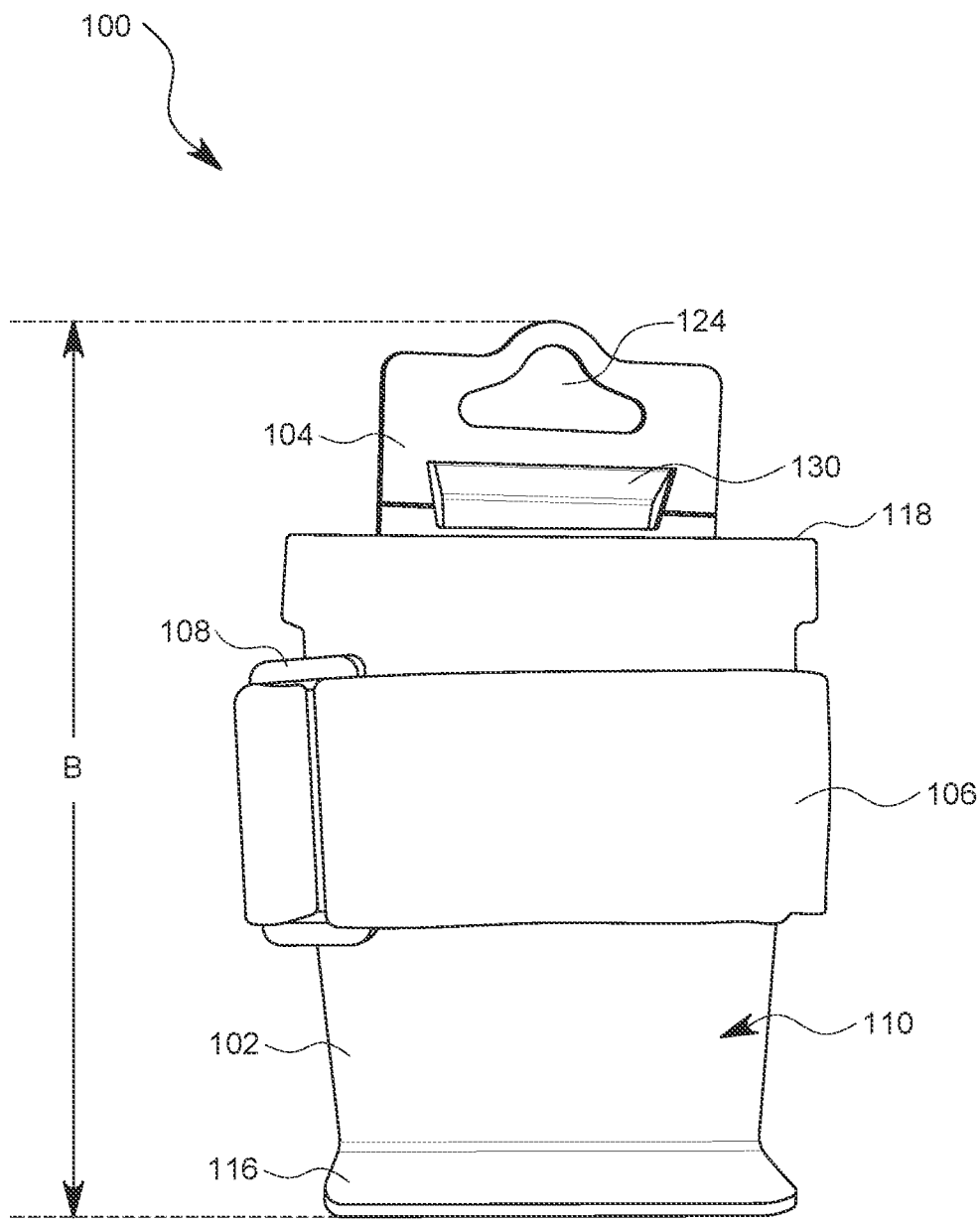
FIG. 1 is a front elevation view of a vehicle interior mountable and adjustable bottle holder apparatus in a closed position, according to a preferred embodiment of the present invention.
Figure 2:
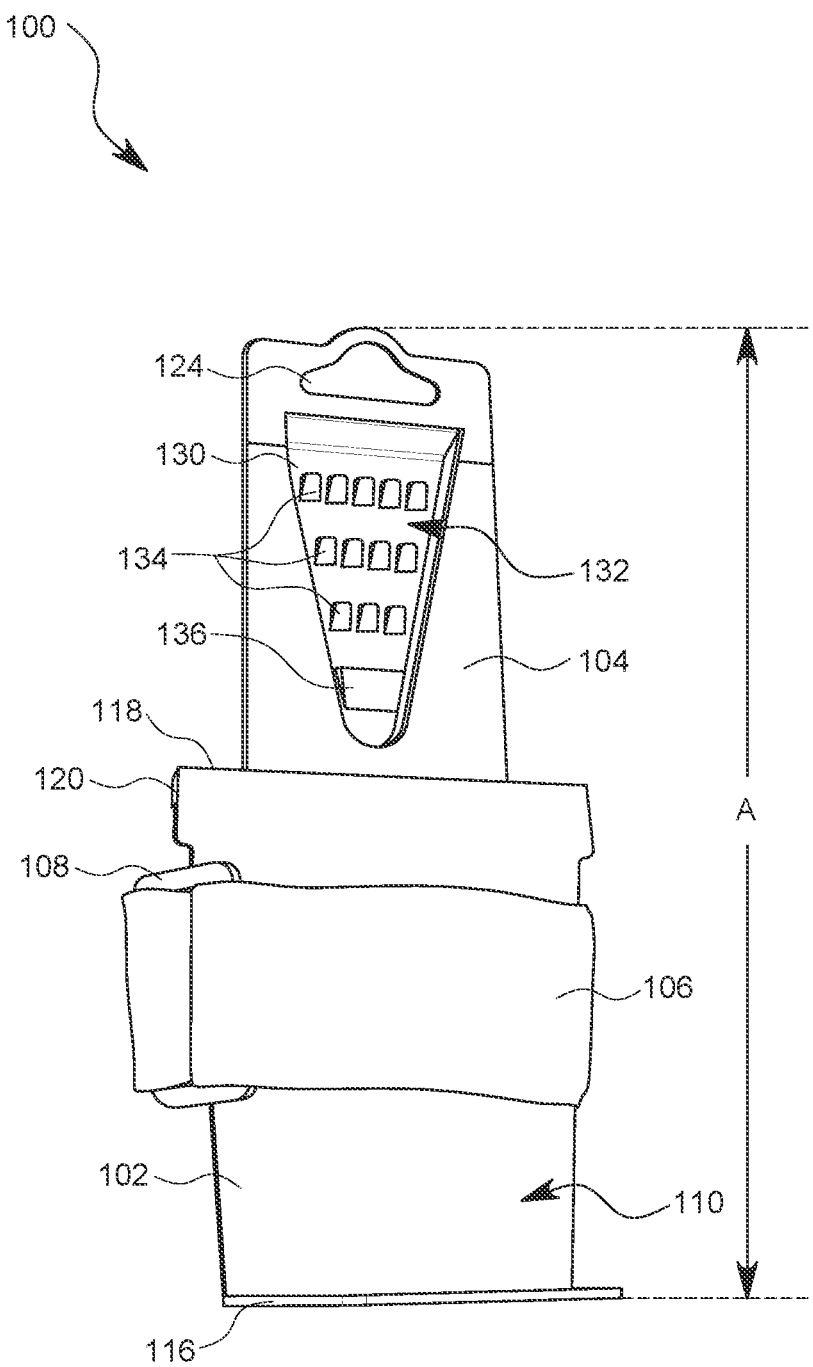
FIG. 2 is a front left side perspective view of a vehicle interior mountable and adjustable bottle holder apparatus in an extended position, according to a preferred embodiment of the present invention.
Figure 3:
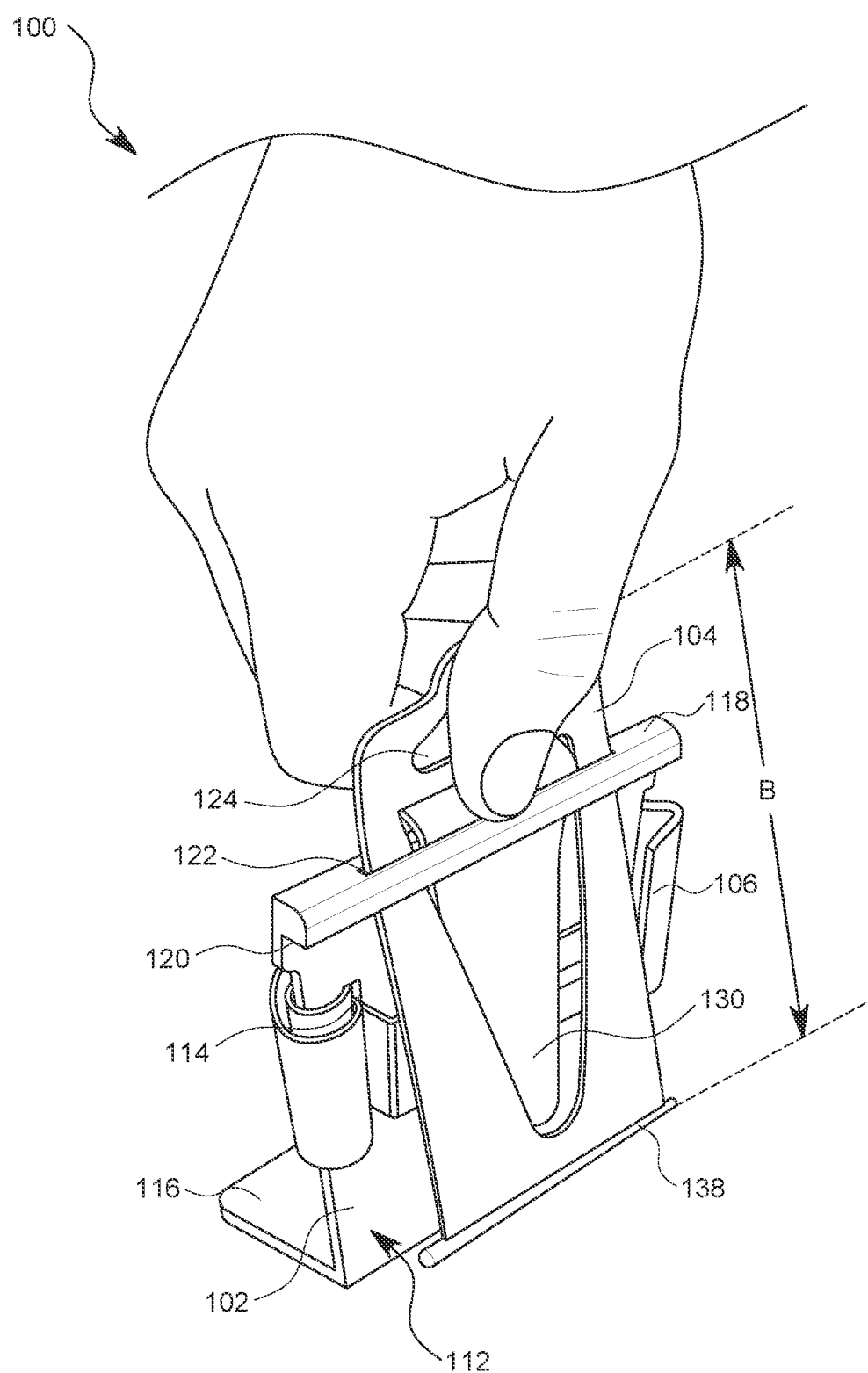
FIG. 3 is a top back right side perspective view of a vehicle interior mountable and adjustable bottle holder apparatus in a closed position, according to preferred embodiments.
Figure 5:
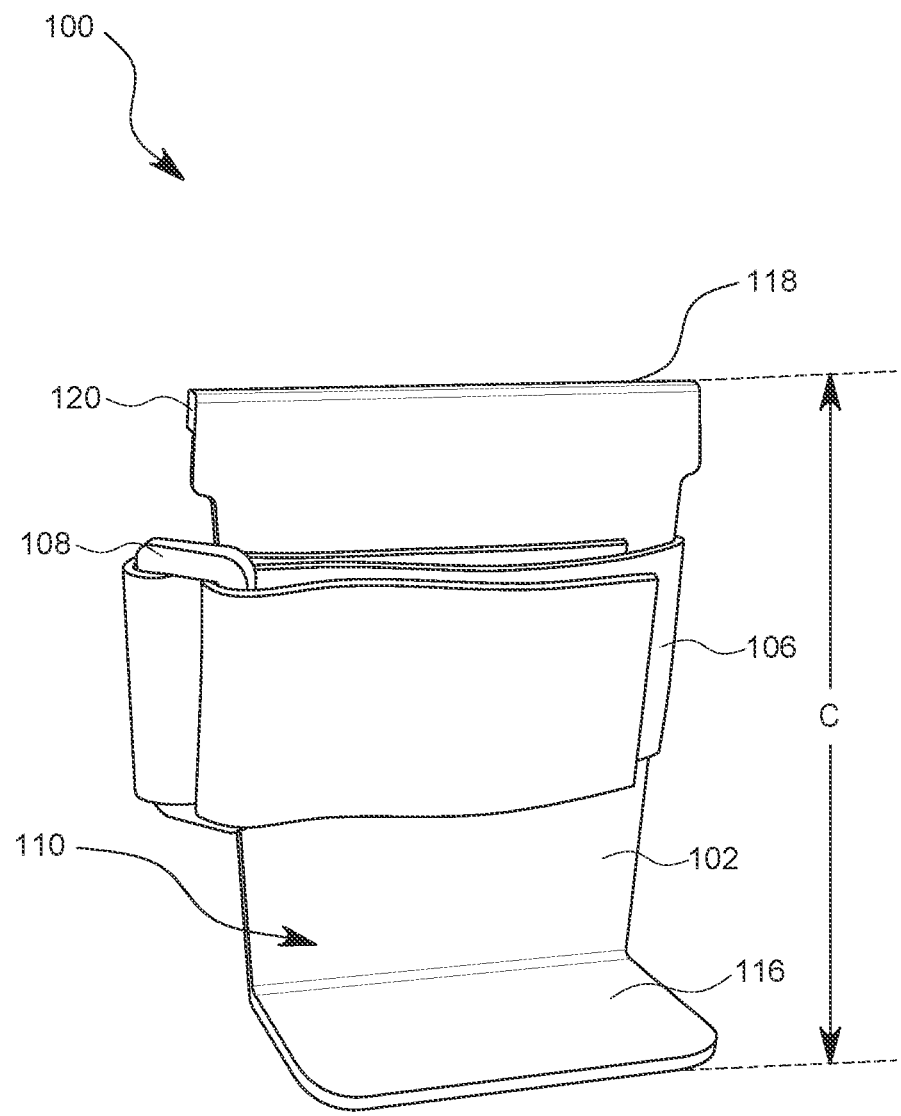
FIG. 5 is a front left perspective view of a vehicle interior mountable and adjustable bottle holder apparatus in a removed position, according to a preferred embodiment of the present invention.
Figure 6:
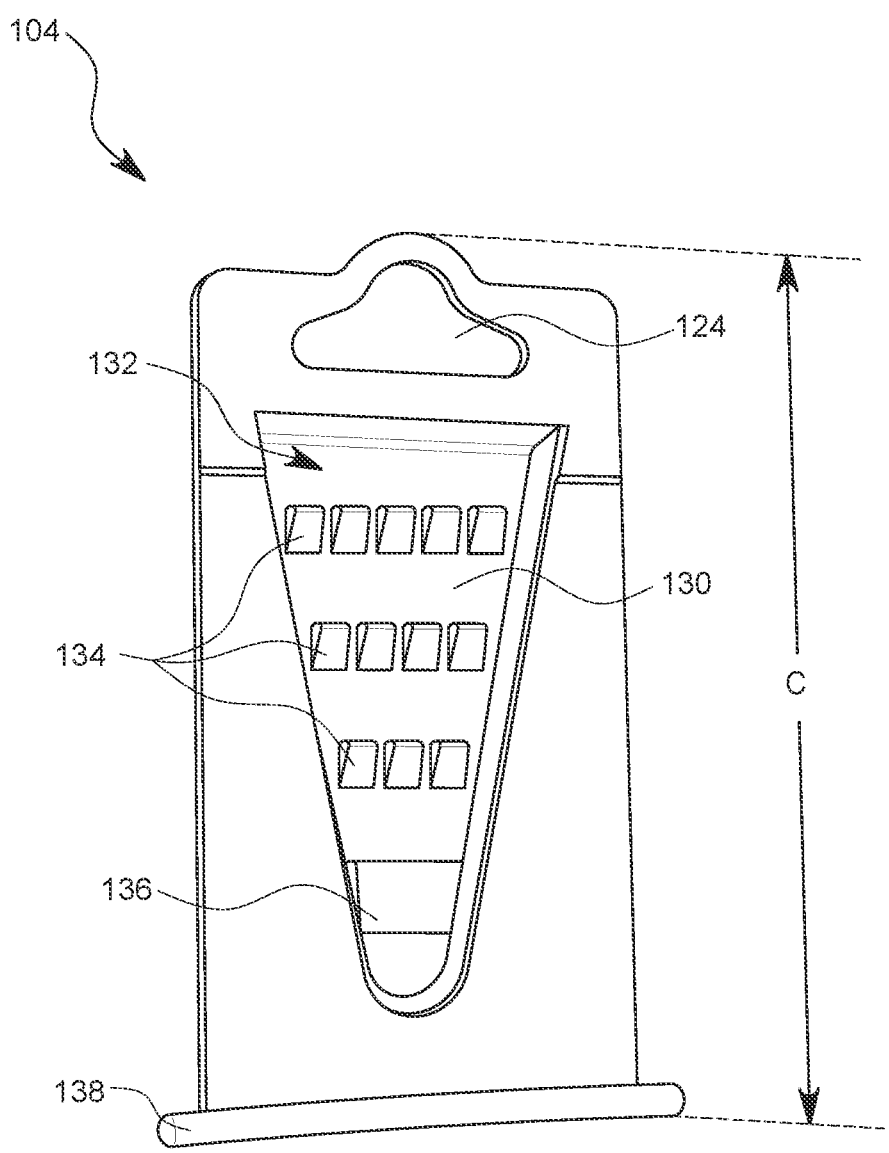
FIG. 6 is a front left perspective view of embodiments showing slidably removable clip in a removed position, according to preferred embodiments.
Figure 7:
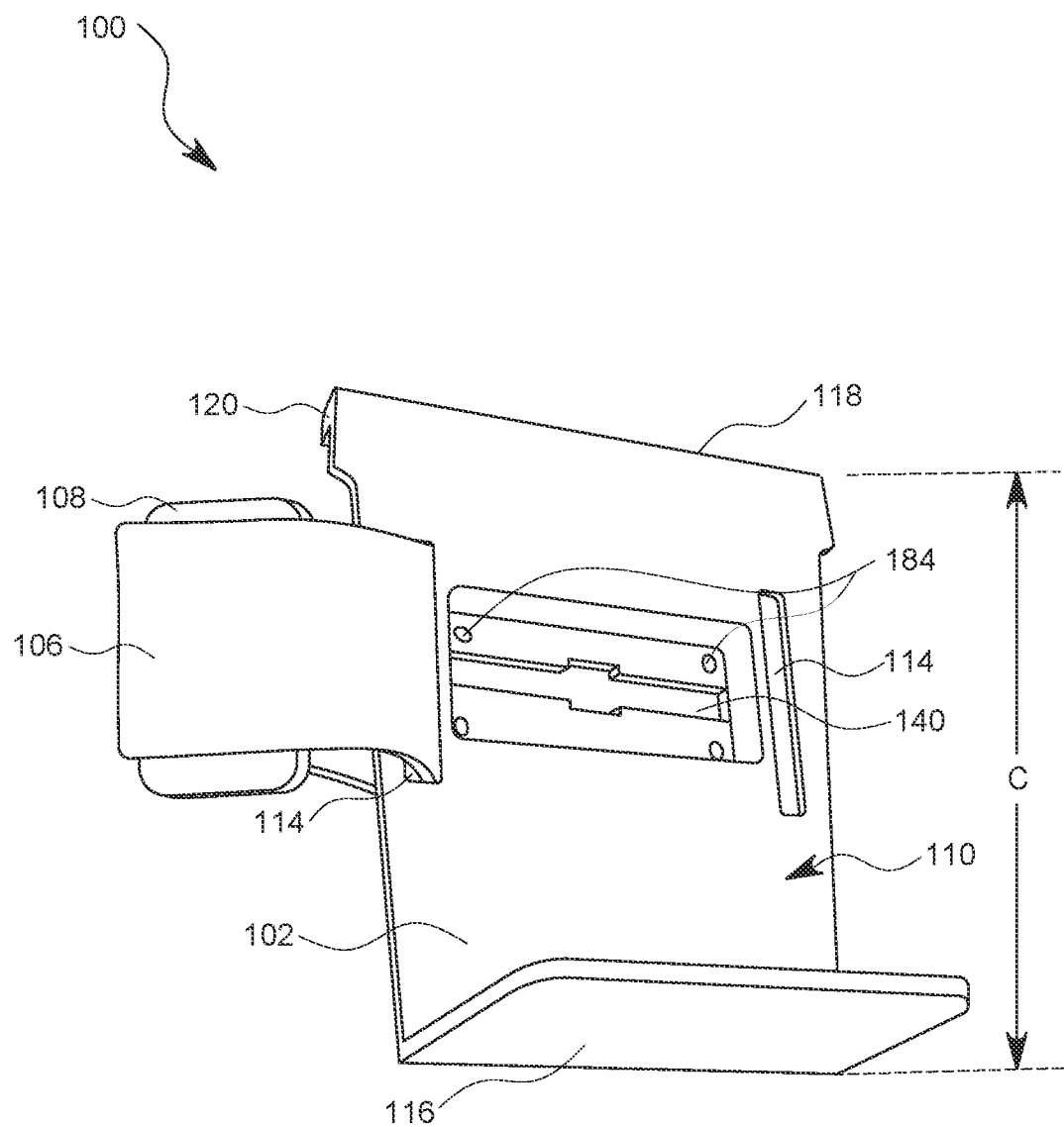
FIG. 7 is a front elevation view of a vehicle interior mountable and adjustable bottle holder apparatus in a closed position, showing opened adjustable elastic strap, according to a preferred embodiment of the present invention.

FIGS. 1-8 illustrate a preferred embodiment of the vehicle interior mountable and adjustable bottle holder apparatus 100 has an L-shaped base 102, a slidably removable clip 104, and an adjustable elastic strap 106 adapted to retain bottles of different shapes and sizes. The vehicle interior mountable and adjustable bottle holder apparatus 100 is tailored to fit, hold, and adjust for the most common dimensions of soap, sanitizer, and similar hygiene product bottles on the market that are used when outside the home. The L-shaped base 102 is preferably made of a high-strength plastic and the slidably removable clip 104 is preferably made from a high-strength flexible material such as rubber, silicone, and certain plastics. As shown in FIGS. 1-2, 5, and 7-8, the adjustable elastic strap 106 includes an elastic strap clip 108 to accommodate the different shapes and sizes of bottles. In accordance with the present invention, the L-shaped base 102 has a front base surface 110 that is opposite a back base surface 112 and at least two adjustable strap apertures 114 therethrough, as shown in FIGS. 1, 3 and 7, that are adapted to receive the adjustable elastic strap 106. The L-shaped base 102 further includes a horizontal base portion 116 that is opposite a rounded base top portion 118 which are arranged between the front base surface 110 and the back base surface 112. The horizontal base portion 116 of the L-shaped base 102 is strong enough to withstand the force exerted when a user presses downward on the pump of the sanitizer or soap bottle to extract liquid such that, unlike a typical cup holder, the bottle need not to be removed from the vehicle interior mountable and adjustable bottle holder apparatus 100 itself while in use.

Figure 4:
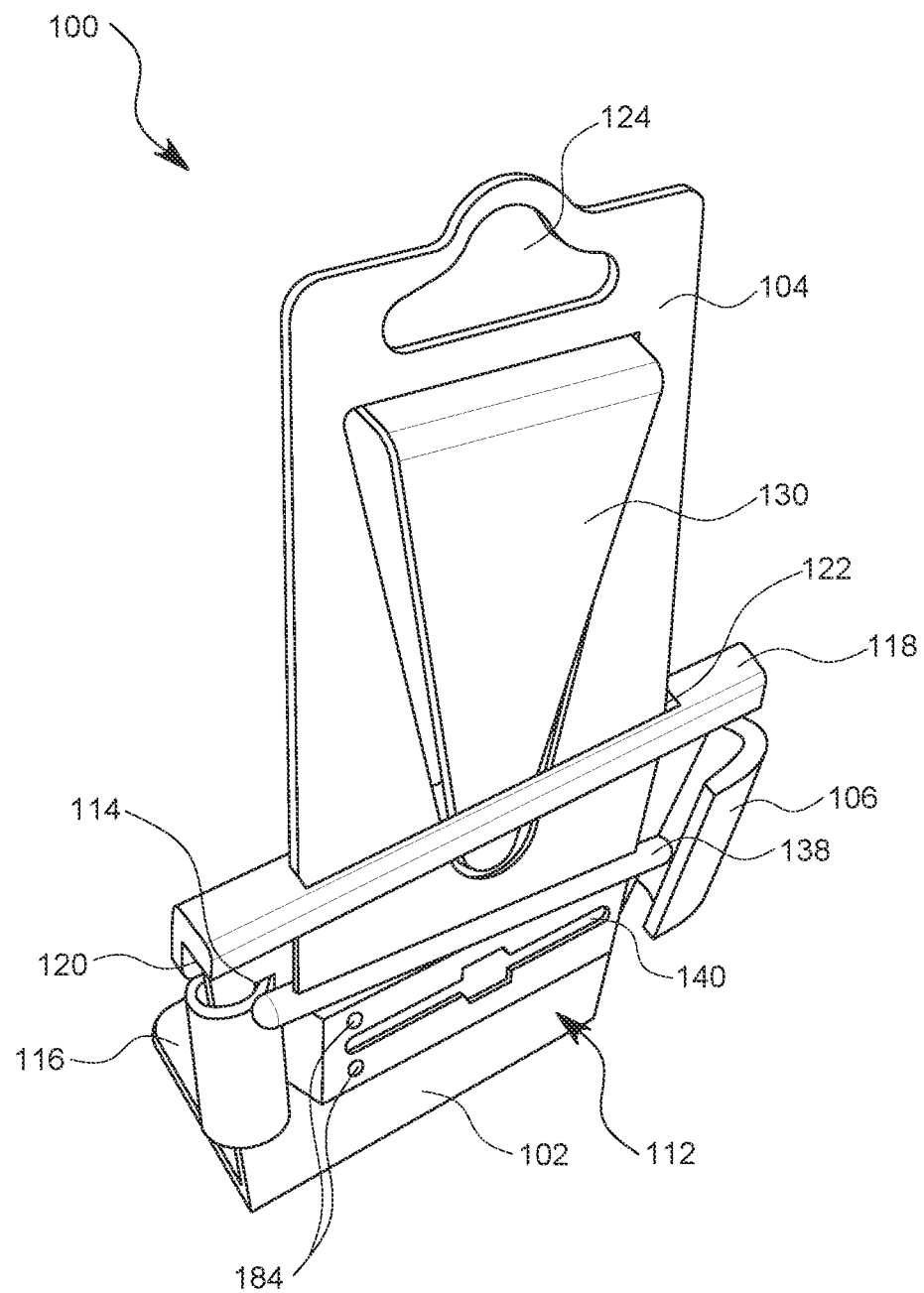
FIG. 4 is a top back right perspective view of a vehicle interior mountable and adjustable bottle holder apparatus in an extended position, according to preferred embodiments.
Figure 8:
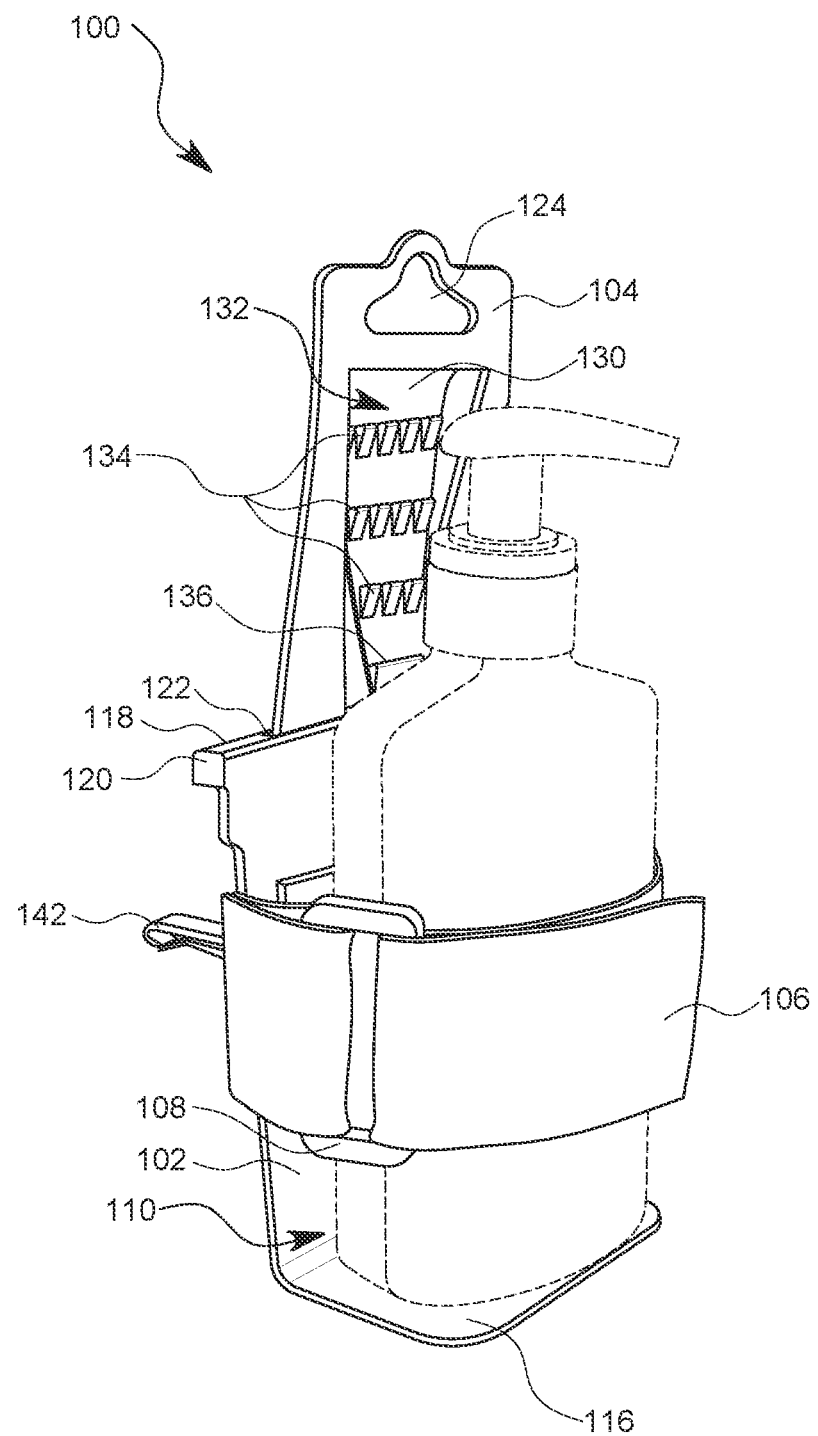
FIG. 8 is a top left side perspective view of a vehicle interior mountable and adjustable bottle holder apparatus in an extended position, according to a preferred embodiment of the present invention.

As illustrated in FIGS. 3-4 and 8, the rounded base top portion 118 forms a clip attachment retention channel 120 that contains a centrally disposed clip aperture 122. The centrally disposed clip aperture 122 is adapted to hold and retain the slidably removable clip 104, which includes a headrest attachment aperture 124, as shown in FIGS. 1-2, 6, and 9, that is adapted to receive a pole 126 of a headrest 128 of a vehicle 148 therethrough, such that the vehicle interior mountable and adjustable bottle holder 100 hangs from the pole 126 of the headrest 128 via the headrest attachment aperture 122 and is supported by the L-shaped base 102. Thus, the back base surface 112 of the vehicle interior mountable and adjustable bottle holder apparatus 100 is adapted to rest upon the back or side of the seat of the vehicle 148. The slidably removable clip 104 has a flexible triangular attachment clip 130 that has a front tongue surface 132, as illustrated in FIG. 6, which includes at least one set of raised inclined gripper members 134 that are oriented horizontally and are equally distributed along the front tongue surface 132. The at least one set of raised inclined gripper members 134 are oriented above an inclined gripper anchor member 136 of the front tongue surface 132.

The present embodiment of the invention includes a cylindrical retention member 138 extending from and affixed along the slidably removable clip 104. When the cylindrical retention member 138 slidably engages the clip attachment retention channel 120 thereby retaining the slidably removable clip 104 in an extended position A from the L-shaped base 102, as shown in FIG. 2. When the front tongue surface 132 of the slidably removable clip 104 is flush against the back base surface 112 of the L-shaped base 102 the slidably removable clip 104 is retained in a closed position B, as illustrated in FIG. 1, and when the slidably removable clip 104 disengages from the centrally disposed clip aperture 122, the slidably removable clip 104 is in a removed position C from the L-shaped base 102, as illustrated in FIGS. 5-6.

Figure 12:
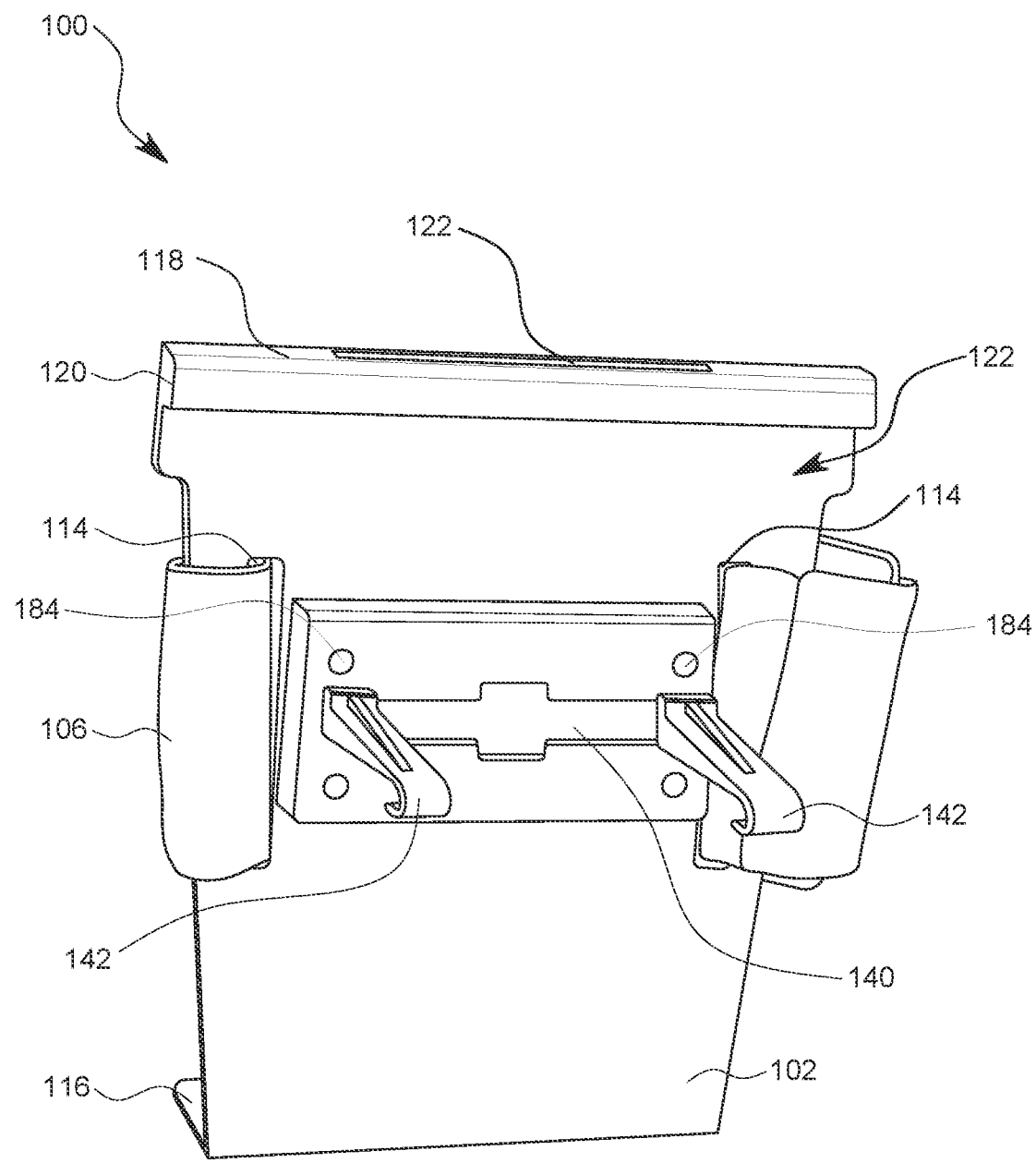
FIG. 12 is a back right side perspective view of a vehicle interior mountable and adjustable bottle holder apparatus in a removed position, showing retention of at least two air vent clips, according to a preferred embodiment of the present invention.
Figure 13:
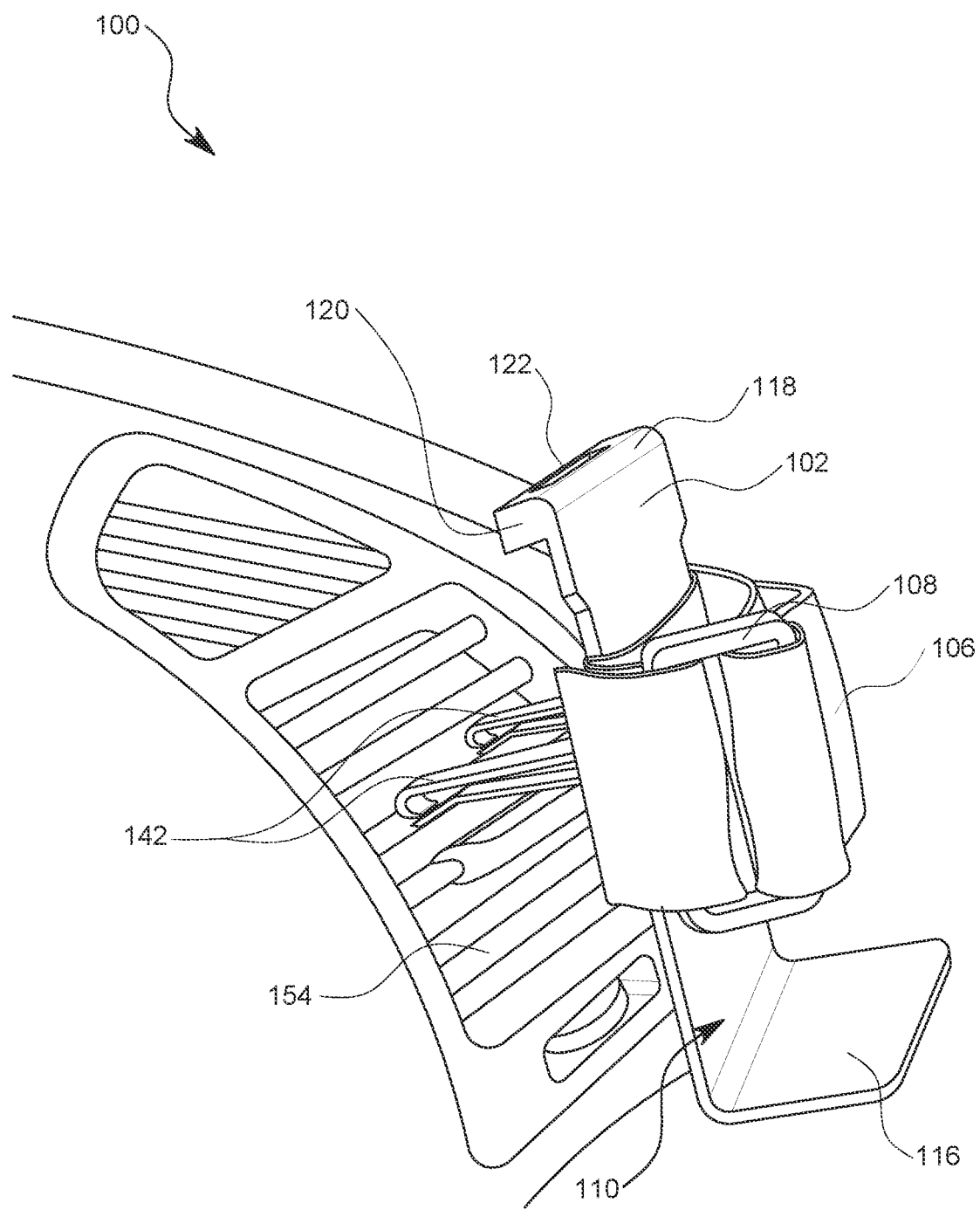
FIG. 13 is a front left side perspective view thereof.

In one embodiment, exemplified by FIG. 12, the vehicle interior mountable and adjustable bottle holder apparatus 100 further includes an extruding air vent clip retention channel 140 which is centrally oriented and formed along the back base surface 112 of the L-shaped base 102. The extruding air vent clip retention channel 140 is adapted to slidably receive and retain at least two air vent clips 142 when the slidably removable clip 104 is in the removed position C. As shown in FIG. 13, when the extruding air vent clip retention channel 140 slidably receives and retains the at least two air vent clips 142, the vehicle interior mountable and adjustable bottle holder apparatus 100 is retained by an air vent 154 of a vehicle 148.

In another embodiment, the extruding air vent clip retention channel 140 has at least two sets of mounting apertures 184, as illustrated in FIG. 12, which are adapted to receive a set of screws for mounting and retention of the vehicle interior mountable and adjustable bottle holder apparatus 100. In an alternative embodiment, the at least two sets of mounting apertures 184 are adapted to receive a set of adhesive dots for adhering the vehicle interior mountable and adjustable bottle holder apparatus 100 to any surface.

In yet another embodiment, the adjustable elastic strap 106 is made of Velcro®.

Figure 10A:
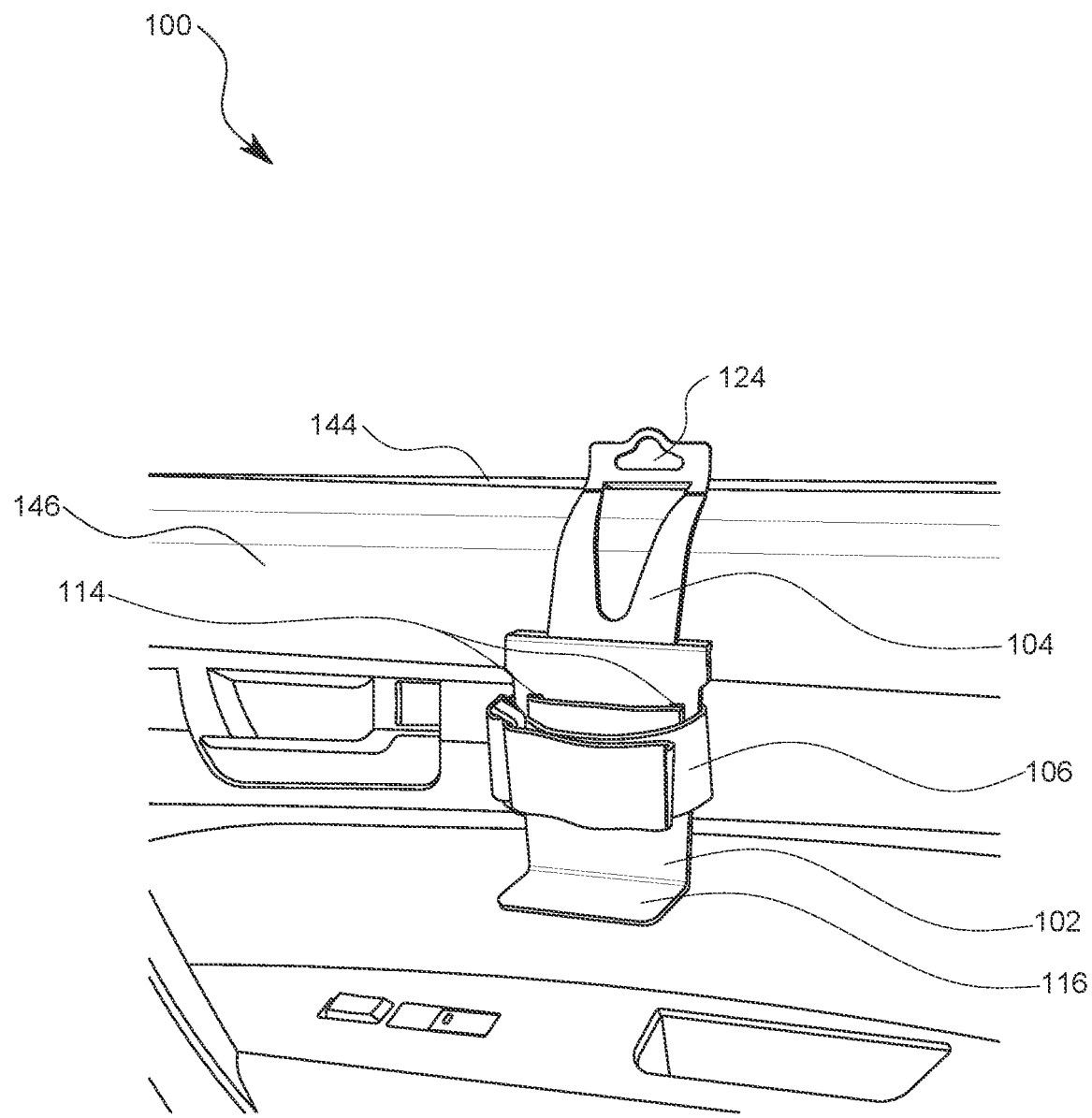
FIG. 10A is a front right side perspective view thereof, showing attachment to a side window panel of a door of a vehicle, according to preferred embodiments.
Figure 10B:
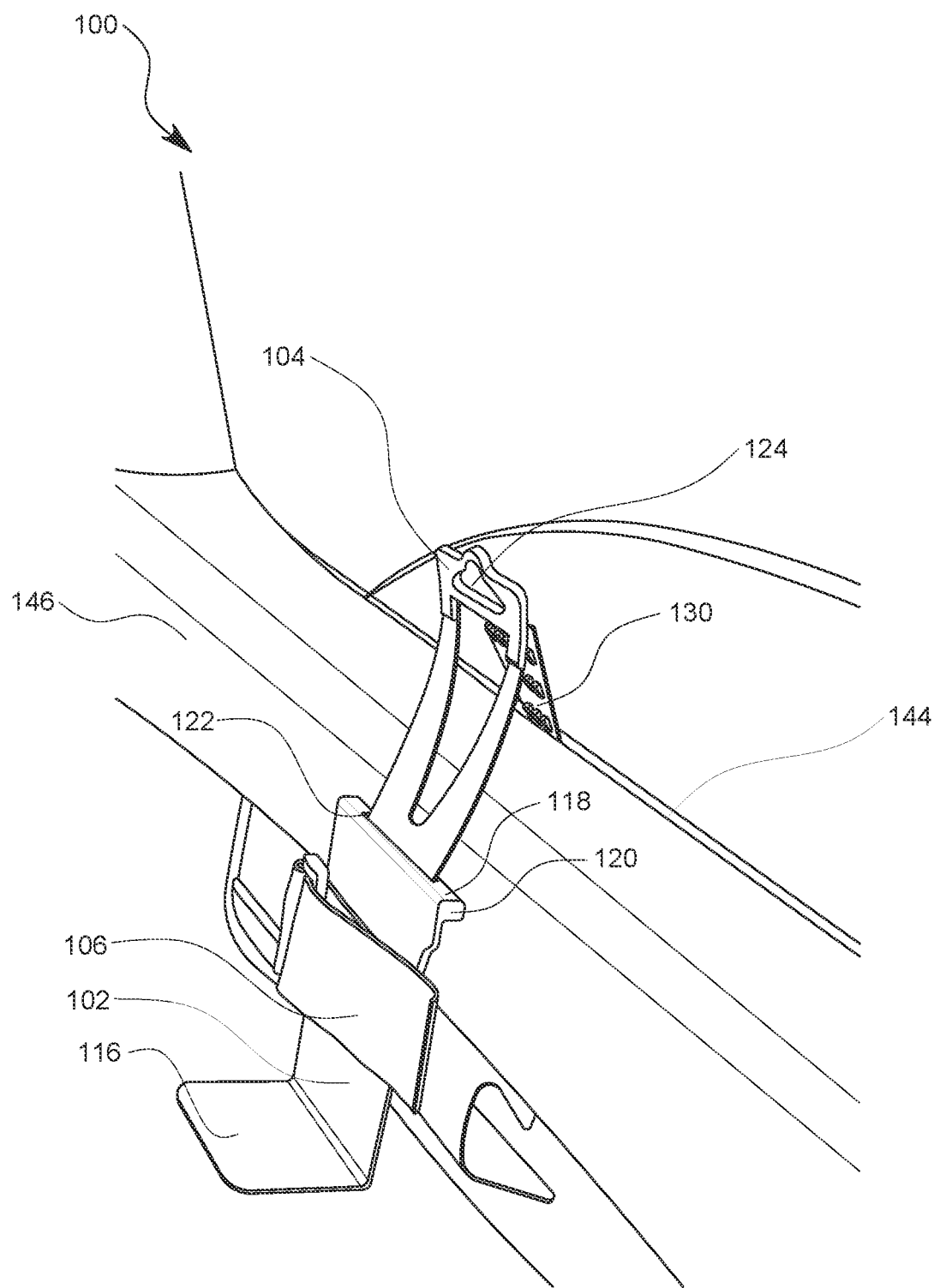
FIG. 10B is a front top right side perspective view thereof, according to preferred embodiments.

In one embodiment, when the slidably removable clip 104 is in the extended position A, as shown in FIG. 2, the flexible triangular attachment clip 130 is adapted to be inserted into and retained by a side window panel 144 in a door 146 of a vehicle 148, as illustrated in FIG. 10.

In another embodiment, when the slidably removable clip 104 is in the extended position A, as illustrated in FIGS. 1 and 3, the flexible triangular attachment clip 130 is adapted to be attached to an inside door handle 150 of a door 146 of a vehicle 148.

In yet another embodiment, when the slidably removable clip 104 is in the extended position A, as illustrated in FIGS. 1 and 3, the flexible triangular attachment clip 130 is adapted to be attached to an armrest 152 of a vehicle 148.

Figure 9A:
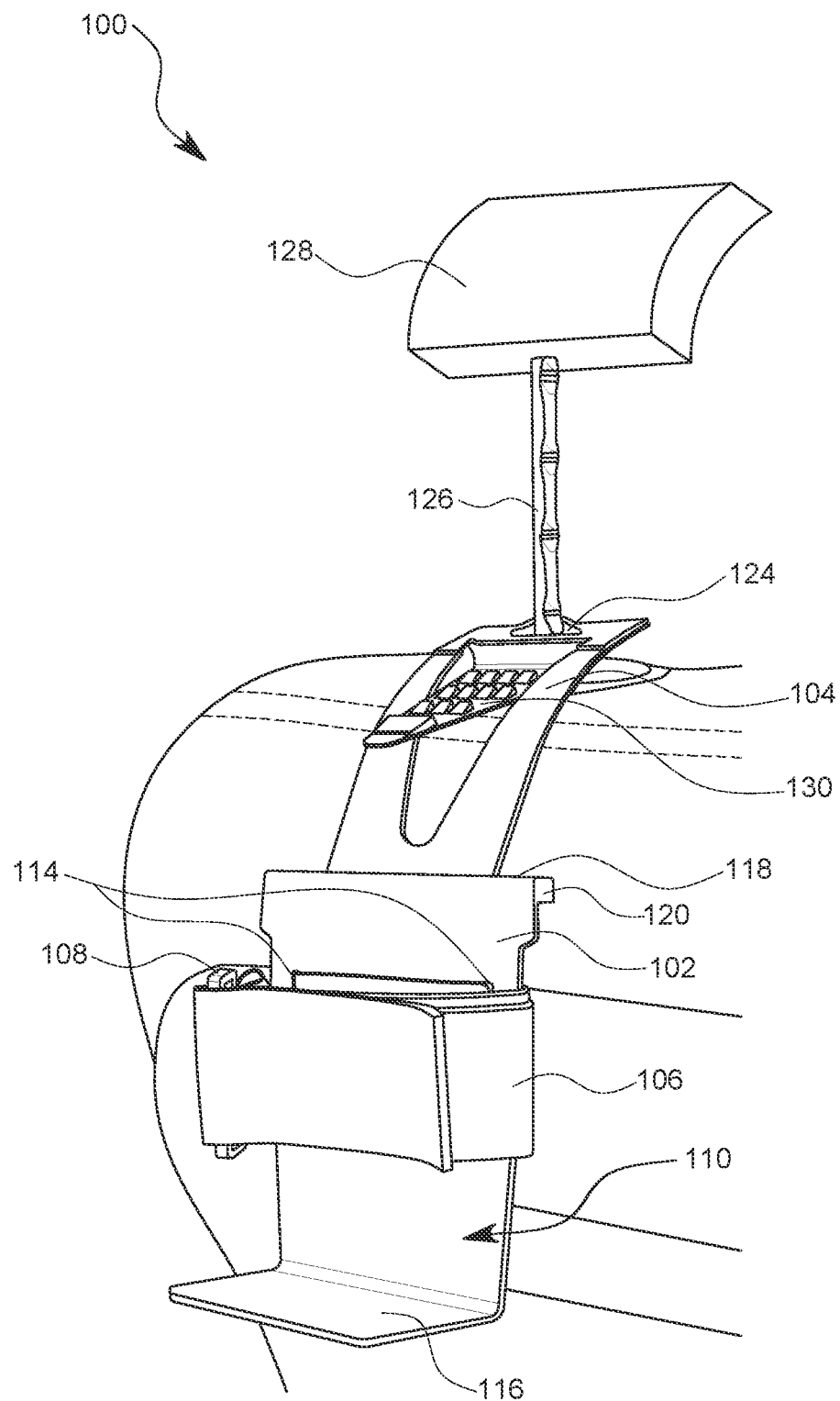
FIG. 9A is a front right side perspective view thereof, showing attachment to a headrest of a vehicle, according to preferred embodiments.
Figure 9B:
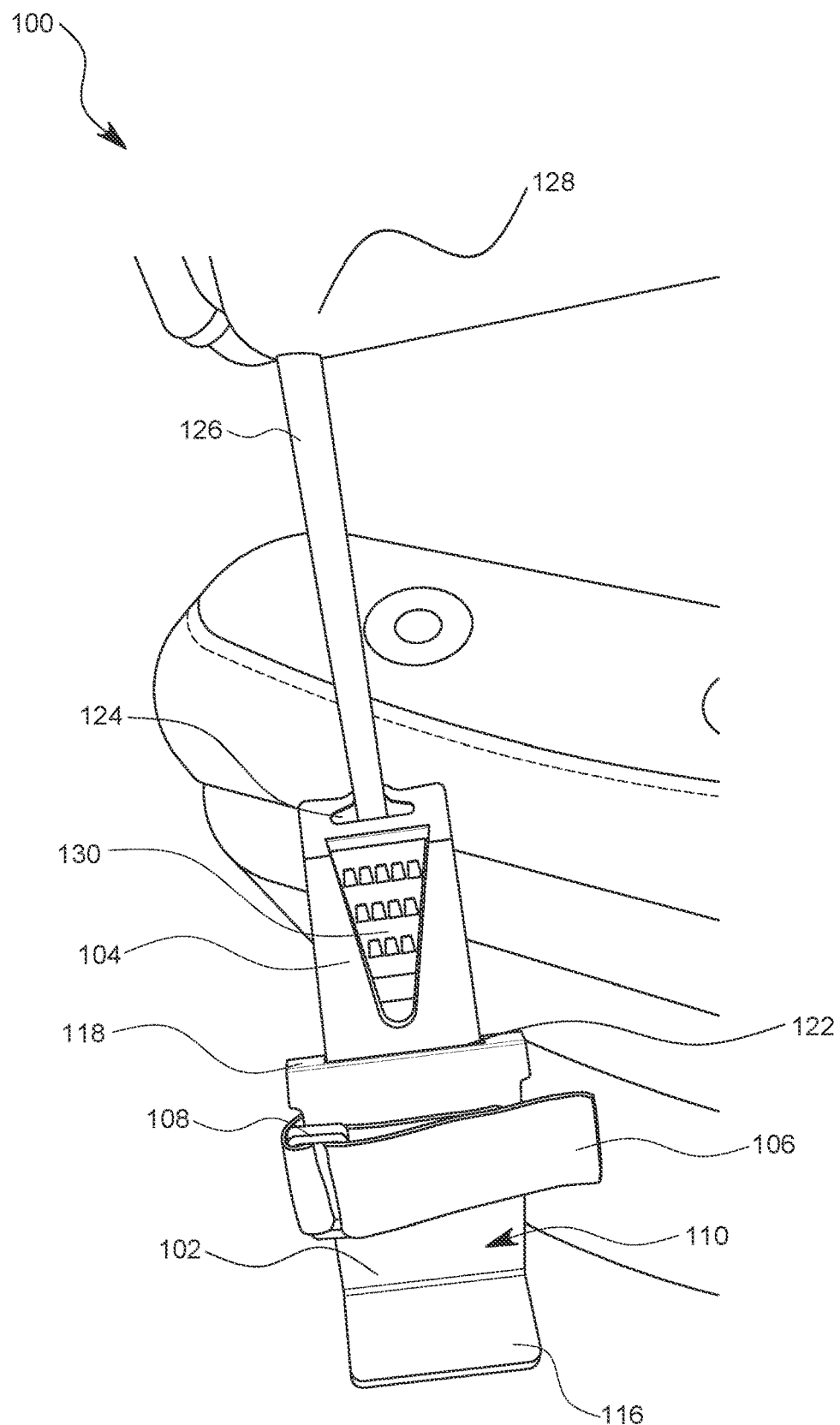
FIG. 9B is a front top perspective view thereof, in accordance with preferred embodiments of the present invention.

As illustrated in FIGS. 1-8 and 11-13, preferred embodiments provide for a vehicle interior mountable and adjustable bottle holder apparatus 100. The vehicle interior mountable and adjustable bottle holder apparatus 100 includes an L-shaped base 102 having a front base surface 110 that is opposite a back base surface 112 and a horizontal base portion 116 that is opposite a rounded base top portion 118, as illustrated in FIGS. 1, 3, 11, and 12. The L-shaped base 102 is preferably made of a high-strength plastic. The horizontal base portion 116 of the L-shaped base 102 is strong enough to withstand the force exerted when a user presses downward on the pump of the sanitizer or soap bottle to extract liquid such that, unlike a typical cup holder, the bottle need not to be removed from the vehicle interior mountable and adjustable bottle holder apparatus 100 itself while in use. Such embodiment includes an extruding air vent clip retention channel 140, which is centrally disposed and formed along the back base surface 112 of the L-shaped base 102, shown in FIG. 12. The extruding air vent clip retention channel 140 is adapted to slidably receive and retain at least two air vent clips 142. A clip attachment retention channel 120 is formed on the rounded base top portion 118 and contains a centrally disposed clip aperture 122, illustrated in FIGS. 3-4, 8, and 11-12, which is adapted to hold and retain a slidably removable clip 104. The slidably removable clip 104 is preferably made from a high-strength flexible material such as rubber or silicone. The slidably removable clip 104, shown in FIG. 6, includes a headrest attachment aperture 124, which is adapted to receive a pole 126 of a headrest 128 of a vehicle 148 therethrough, as exemplified in FIGS. 9A and 9B. In such embodiment, the pole 126 of the headrest 128 must be disengaged from the seat for the pole 126 to be inserted through the headrest attachment aperture 124, as illustrated by FIG. 9B. Thus, the back base surface 112 of the vehicle interior mountable and adjustable bottle holder apparatus 100 is adapted to rest upon the back or side of the seat of the vehicle 148.

Figure 11:
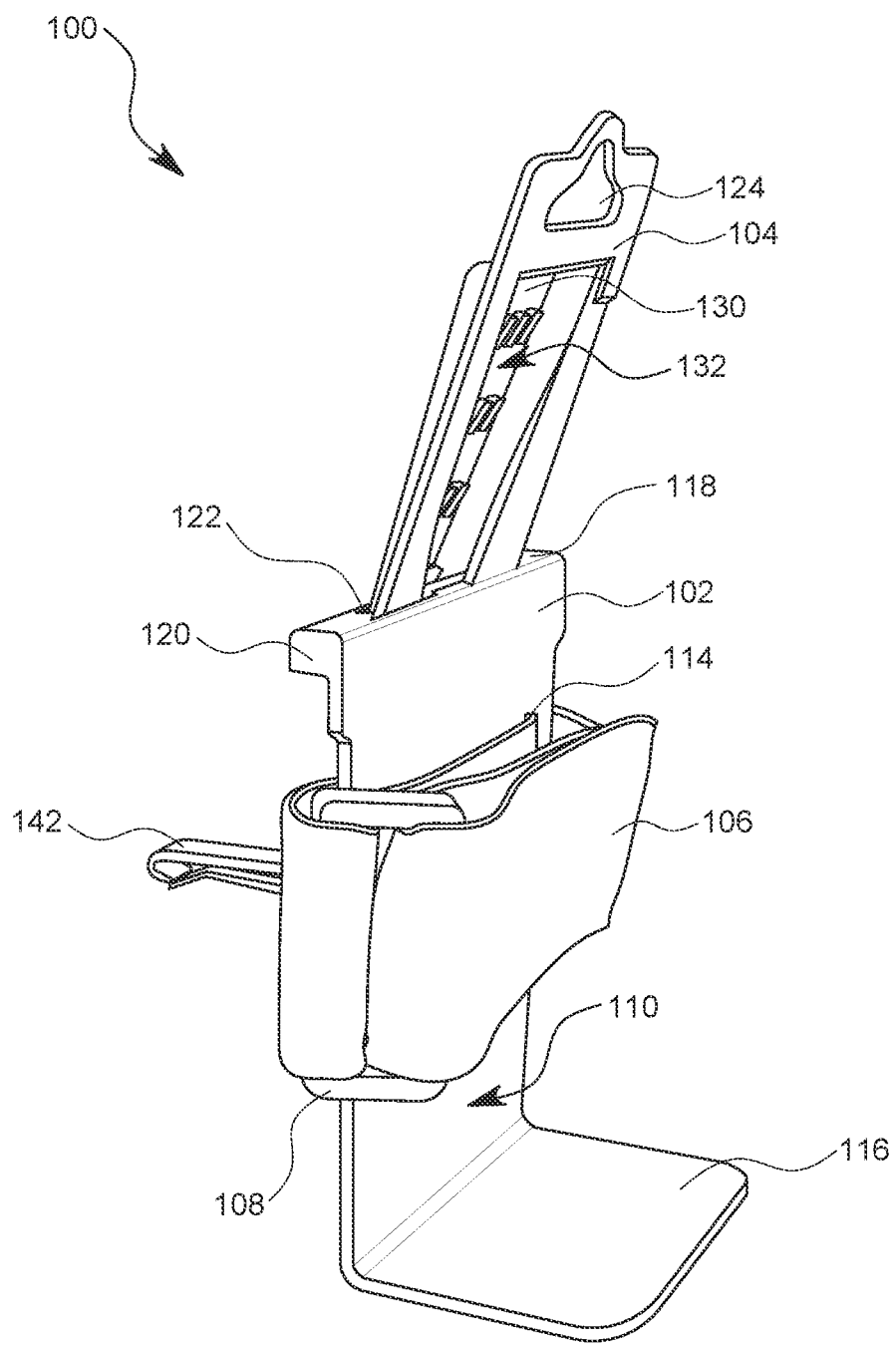
FIG. 11 is a top front left side perspective view of a vehicle interior mountable and adjustable bottle holder apparatus in an extended position, according to a preferred embodiment of the present invention.

As shown in FIGS. 6, 8, and 11, the slidably removable clip 104 also includes a flexible triangular attachment clip 130, which has a front tongue surface 132 having at least one set of raised inclined gripper members 134 that are oriented horizontally and are equally distributed along the front tongue surface 132. The at least one set of raised inclined gripper members 134 are oriented above an inclined gripper anchor member 136 of the front tongue surface 132. A cylindrical retention member 138 extends from and is affixed along the slidably removable clip 104. When the cylindrical retention member 138 slidably engages the clip attachment retention channel 120, as shown in FIG. 11, the slidably removable clip 104 is retained in an extended position A from the L-shaped base 102. When the front tongue surface 132 of the slidably removable clip 104 is flush against the back base surface 112 of the L-shaped base 102, as shown in FIGS. 1 and 3, the slidably removable clip 104 is retained in a closed position B. When the slidably removable clip 104 disengages from the centrally disposed clip aperture 122, illustrated in FIGS. 5-6 and 12, the slidably removable clip 104 is in a removed position C from the L-shaped base 102.

Such embodiment of the invention, as illustrated in FIG. 7, also includes at least two adjustable strap apertures 114, which are oriented through the front base surface 112. Each of the at least two adjustable strap apertures 114 are adapted to receive an adjustable elastic strap 106. The adjustable elastic strap 106 includes an elastic strap clip 108, which is adapted to adjust the adjustable elastic strap 106 in order to secure bottles of varying shapes and sizes. The vehicle interior mountable and adjustable bottle holder apparatus 100 is tailored to fit, hold, and adjust for the most common dimensions of soap, sanitizer, and similar hygiene product bottles on the market that are used when outside the home.

In one embodiment, the adjustable elastic strap 106 is made of Velcro®.

In another embodiment, when the slidably removable clip 104 is in the extended position A, the flexible triangular attachment clip 130 is adapted for insertion and retention into a side window panel 144 in a door 146 of a vehicle 148, as exemplified in FIG. 10.

In yet another embodiment, when the slidably removable clip 104 is in the extended position A, as illustrated in FIG. 1, the flexible triangular attachment clip 130 is adapted for attachment to an inside door handle 150 of a door 146 of a vehicle 148.

In one embodiment, when the slidably removable clip 104 is in the extended position A, shown in FIG. 1, the flexible triangular attachment clip 130 is adapted to be attached to an armrest 152 of a vehicle 148.

In another embodiment, as shown in FIGS. 6 and 12-13, the L-shaped base 102 and the at least two air vent clips 142 are adapted to be attached to an air vent 154 of a vehicle 148 when the slidably removable clip 104 is in the removed position C.

In yet another embodiment, extruding air vent clip retention channel 140 has at least two sets of mounting apertures 184, as illustrated in FIG. 12, which are adapted to receive a set of screws for mounting and retention of the vehicle interior mountable and adjustable bottle holder apparatus 100. In an alternative embodiment, the at least two sets of mounting apertures 184 are adapted to receive a set of adhesive dots for adhering the vehicle interior mountable and adjustable bottle holder apparatus 100 to any surface.

Figure 14:
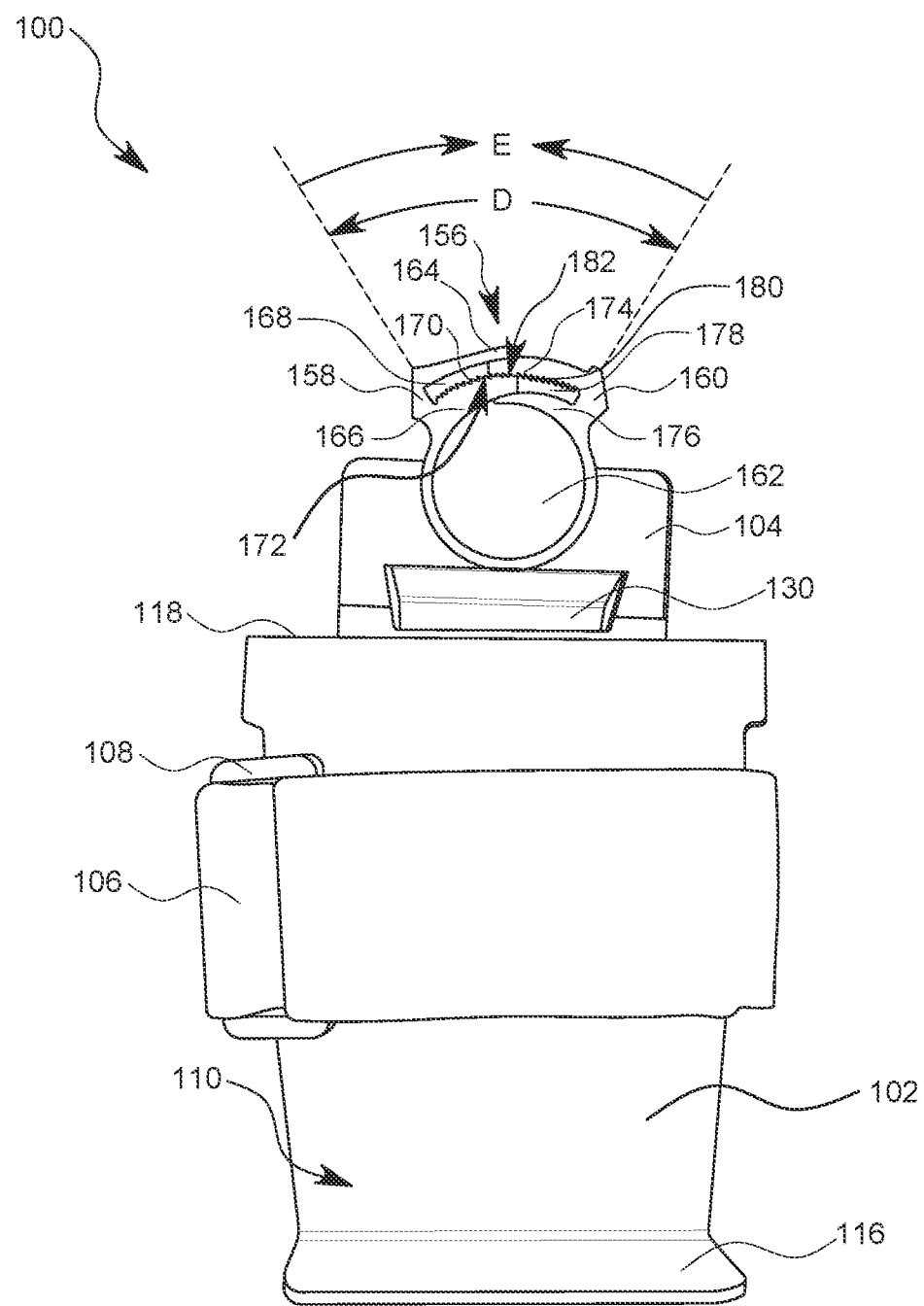
FIG. 14 is a front elevation view of a vehicle interior mountable and adjustable bottle holder apparatus in a closed position, according to a preferred embodiment of the present invention.
Figure 15:
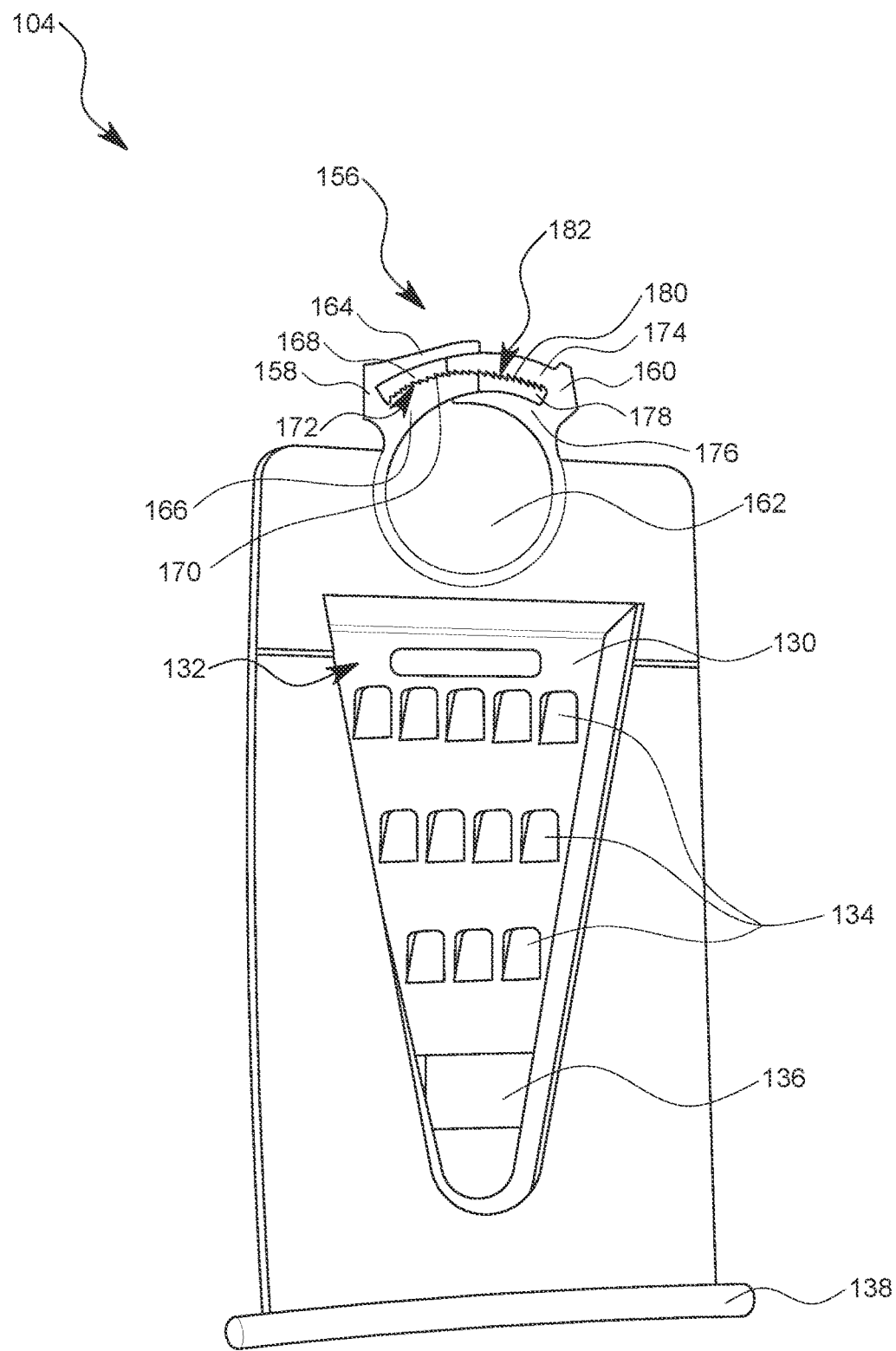
FIG. 15 is a front left perspective view of embodiments showing slidably removable clip in a removed position, according to preferred embodiments.

Turning to FIGS. 14-15, in some preferred embodiments of the invention, there is provided a vehicle interior mountable and adjustable bottle holder apparatus 100. The vehicle interior mountable and adjustable bottle holder apparatus 100 includes an L-shaped base 102, a slidably removable clip 104, an adjustable elastic strap 106, which is adapted to retain bottles of different shapes and sizes, and an elastic strap clip 108 that is adapted to receive the adjustable elastic strap 106. The L-shaped base 102 is preferably made of a high-strength plastic and the slidably removable clip 104 is preferably made from a high-strength flexible material such as rubber, silicone, or certain plastics. As exemplified in FIGS. 5, 7, and 14, the L-shaped base 102 has a front base surface 110 that is oriented opposite a back base surface 112, and contains at least two adjustable strap apertures 114 therethrough. Each of the at least two adjustable strap apertures 114 are adapted to receive the adjustable elastic strap 106. The L-shaped base 102 also includes a horizontal base portion 116 that is oriented opposite a rounded base top portion 118, which are positioned between the front base surface 110 and the back base surface 112. The horizontal base portion 116 of the L-shaped base 102 is strong enough to withstand the force exerted when a user presses downward on the pump of the sanitizer or soap bottle to extract liquid such that, unlike a typical cup holder, the bottle need not to be removed from the vehicle interior mountable and adjustable bottle holder apparatus 100 itself while in use.

The rounded base top portion 118 forms a clip attachment retention channel 120 that contains a centrally disposed clip aperture 122, as exemplified in FIGS. 11-12, which is adapted to hold and retain the slidably removable clip 104. In such embodiment, the slidably removable clip 104 includes an interlocking headrest clamp 156, as illustrated in FIGS. 14-15, which is adapted to receive and securely retain a pole 126 of a headrest 128 of a vehicle 148 therethrough, such that the vehicle interior mountable and adjustable bottle holder 100 hangs from the pole 126 of the headrest 128 via the interlocking headrest clamp 156 and is supported by the L-shaped base 102, exemplified by FIG. 9A. Thus, the back base surface 112 of the vehicle interior mountable and adjustable bottle holder apparatus 100 is adapted to rest upon the back or side of the seat of the vehicle 148. The interlocking headrest clamp 156 has a first interlocking member 158 and a second interlocking member 160, which form an open-ended band 162 in a relaxed position D. The first interlocking member 158 has an upper tongue 164 positioned opposite a lower jaw 166, which forms a first elongated open-ended cavity 168 and a first row of clamping teeth 170 are formed on an inner surface 172 of the lower jaw 166. The second interlocking member 160 has an upper jaw 174 positioned opposite a lower tongue 176, which forms a second elongated open-ended cavity 178 and a second row of clamping teeth 180, which are formed on an inner surface 182 of the upper jaw 174. The first interlocking member 158 slidably engages with the second interlocking member 160 in a locking position E, as shown in FIG. 15. In such embodiments, the interlocking headrest clamp 156 is adapted to engage the pole 126 of the headrest 128 when the first interlocking member 158 and the second interlocking member 160 surround the pole 126 and engage each other when the interlocking headrest clamp 156 goes from the relaxed position D to the locking position E, similarly illustrated in FIG. 9A.

Such preferred embodiment includes a flexible triangular attachment clip 130 that has a front tongue surface 132, illustrated in FIG. 15, which includes at least one set of raised inclined gripper members 134 that are oriented horizontally and are equally distributed along the front tongue surface 132. The at least one set of raised inclined gripper members 134 are oriented above an inclined gripper anchor member 136 of the front tongue surface 132. A cylindrical retention member 138 extends from and is disposed along the slidably removable clip 104. When the cylindrical retention member 138 slidably engages the clip attachment retention channel 120, as exemplified by FIG. 2, the slidably removable clip 104 is retained in an extended position A from the L-shaped base 102. When the front tongue surface 132 of the slidably removable clip 104 is oriented flush against the back base surface 112 of the L-shaped base 102, shown in FIG. 14, the slidably removable clip 104 is in a closed position B. When the slidably removable clip 104 is disengaged from the centrally disposed clip aperture 122, as illustrated by FIGS. 5 and 15, the slidably removable clip 104 is in a removed position C from the L-shaped base 102.

In one embodiment, the vehicle interior mountable and adjustable bottle holder apparatus 100 further includes an extruding air vent clip retention channel 140, illustrated in FIG. 12, which is centrally oriented on and formed along the back base surface 112 of the L-shaped base 102. The extruding air vent clip retention channel 140 is adapted to slidably receive and retain at least two air vent clips 142 when the slidably removable clip 104 is in the removed position C.

In another embodiment, the extruding air vent clip retention channel 140 has at least two sets of mounting apertures 184, as illustrated in FIG. 12, which are adapted to receive a set of screws for mounting and retention of the vehicle interior mountable and adjustable bottle holder apparatus 100. In an alternative embodiment, the at least two sets of mounting apertures 184 are adapted to receive a set of adhesive dots for adhering the vehicle interior mountable and adjustable bottle holder apparatus 100 to any surface.

In yet another embodiment, the adjustable elastic strap 106 is made of Velcro®.

In one embodiment, when the slidably removable clip 104 is in the extended position A, the flexible triangular attachment clip 130 is adapted to be inserted into and retained by a side window panel 144 in a door 146 of a vehicle 148, exemplified by FIG. 10.

In another embodiment, when the slidably removable clip 104 is in the extended position A, shown in FIG. 14, the flexible triangular attachment clip 130 is adapted to be attached to an inside door handle 150 of a door 146 of a vehicle 148.

In yet another embodiment, when the slidably removable clip 104 is in the extended position A, illustrated in FIG. 14, the flexible triangular attachment clip 130 is adapted to be attached to an armrest 152 of a vehicle 148.

It will be apparent to persons skilled in the relevant art that various changes in form and detail can be made without departing from the spirit and scope of the invention. While various embodiments of the present invention have been described above, it should be understood that they have been presented by way of example only, and not limitation. Thus, the breadth and scope of the present invention should not be limited by any of the above-described exemplary embodiments, but should only be defined in accordance with the following claims and their equivalents. All patents and publications discussed herein are incorporated in their entirety by reference thereto.

The invention claimed is:

1. A vehicle interior mountable and adjustable bottle holder apparatus, comprising:
    an L-shaped base;
    a slidably removable clip;
    an adjustable elastic strap adapted to retain bottles of different shapes and sizes;
    an elastic strap clip adapted to receive the adjustable elastic strap;
    wherein the L-shaped base comprises:
        a front base surface opposite a back base surface containing at least two adjustable strap apertures therethrough, each adapted to receive the adjustable elastic strap;
        a horizontal base portion opposite a rounded base top portion disposed between the front base surface and the back base surface;
            wherein the rounded base top portion forms a clip attachment retention channel containing a centrally disposed clip aperture adapted to receive and retain the slidably removable clip;
    wherein the slidably removable clip comprises:
        a headrest attachment aperture adapted to receive a pole of a headrest therethrough;
        a flexible triangular attachment clip having a front tongue surface comprising at least one set of raised inclined gripper members oriented horizontally and equally distributed along the front tongue surface oriented above an inclined gripper anchor member of the front tongue surface;
        a cylindrical retention member extending from and disposed along the slidably removable clip, wherein when said cylindrical retention member slidably engages the clip attachment retention channel said slidably removable clip is retained in an extended position from said L-shaped base;
        wherein when said front tongue surface of said slidably removable clip is flush against the back base surface of the L-shaped base said slidably removable clip is retained in a closed position; and
        wherein when said slidably removable clip disengages said centrally disposed clip aperture, said slidably removable clip is in a removed position from said L-shaped base.

2. The apparatus of claim 1, further comprising an extruding air vent clip retention channel centrally disposed and formed along the back base surface of the L-shaped base adapted to slidably receive and retain at least two air vent clips when the slidably removable clip is in the removed position.

3. The apparatus of claim 1, wherein the adjustable elastic strap is hook and loop.

4. The apparatus of claim 1, wherein with the slidably removable clip in the extended position, said flexible triangular attachment clip is adapted for insertion and retention into a side window panel in a door of a vehicle.

5. The apparatus of claim 1, wherein with the slidably removable clip in the extended position, said flexible triangular attachment clip is adapted for attachment to an inside door handle of a door of a vehicle.

6. The apparatus of claim 1, wherein with the slidably removable clip in the extended position, said flexible triangular attachment clip is adapted for attachment to an armrest of a vehicle.

7. A vehicle interior mountable and adjustable bottle holder apparatus, comprising:
an L-shaped base comprising a front base surface opposite a back base surface, a horizontal base portion opposite a rounded base top portion, an extruding air vent clip retention channel centrally disposed and formed along the back base surface of the L-shaped base adapted to slidably receive and retain at least two air vent clips;
a clip attachment retention channel formed on the rounded base top portion containing a centrally disposed clip aperture adapted to hold and retain a slidably removable clip, wherein the slidably removable clip comprises a headrest attachment aperture adapted to receive a pole of a headrest therethrough, a flexible triangular attachment clip having a front tongue surface comprising at least one set of raised inclined gripper members oriented horizontally and equally distributed along the front tongue surface oriented above an inclined gripper anchor member of the front tongue surface, a cylindrical retention member extending from and disposed along the slidably removable clip, wherein when said cylindrical retention member slidably engages the clip attachment retention channel said slidably removable clip is retained in an extended position from said L-shaped base;
wherein when said front tongue surface of said slidably removable clip is flush against the back base surface of the L-shaped base said slidably removable clip is retained in a closed position; and
wherein when said slidably removable clip disengages said centrally disposed clip aperture, said slidably removable clip is in a removed position from said L-shaped base; and
at least two adjustable strap apertures disposed through the front base surface, each adapted to receive an adjustable elastic strap, wherein the adjustable elastic strap includes an elastic strap clip adapted for adjustment of the adjustable elastic strap for securing bottles of varying shapes and sizes.

8. The apparatus of claim 7, wherein the adjustable elastic strap is hook and loop.

9. The apparatus of claim 7, wherein with the slidably removable clip in the extended position, said flexible triangular attachment clip is adapted for insertion and retention into a side window panel in a door of a vehicle.

10. The apparatus of claim 7, wherein with the slidably removable clip in the extended position, said flexible triangular attachment clip is adapted for attachment to an inside door handle of a door of a vehicle.

11. The apparatus of claim 7, wherein with the slidably removable clip in the extended position, said flexible triangular attachment clip is adapted for attachment to an armrest of a vehicle.

12. The apparatus of claim 7, wherein the L-shaped base and the at least two air vent clips are adapted for attachment to an air vent of a vehicle when the slidably removable clip is in the removed position.

13. A vehicle interior mountable and adjustable bottle holder apparatus, comprising:
an L-shaped base;
a slidably removable clip;
an adjustable elastic strap adapted to retain bottles of different shapes and sizes;
an elastic strap clip adapted to receive the adjustable elastic strap;
wherein the L-shaped base comprises a front base surface opposite a back base surface containing at least two adjustable strap apertures therethrough, each adapted to receive the adjustable elastic strap;
a horizontal base portion opposite a rounded base top portion disposed between the front base surface and the back base surface, wherein the rounded base top portion forms a clip attachment retention channel containing a centrally disposed clip aperture adapted to hold and retain the slidably removable clip;
wherein the slidably removable clip comprises:
an interlocking headrest clamp adapted to receive and securely retain a pole of a headrest therethrough, wherein the interlocking headrest clamp comprises:
a first interlocking member and a second interlocking member forming an open-ended band in a relaxed position, wherein the first interlocking member comprises an upper tongue opposite a lower jaw forming a first elongated open-ended cavity, a first row of clamping teeth formed on an inner surface of the lower jaw, wherein the second interlocking member comprises an upper jaw opposite a lower tongue forming a second elongated open-ended cavity, a second row of clamping teeth formed on an inner surface of the upper jaw;
wherein the first interlocking member slidably engages the second interlocking member in a locking position;
a flexible triangular attachment clip having a front tongue surface comprising at least one set of raised inclined gripper members oriented horizontally and equally distributed along the front tongue surface oriented above an inclined gripper anchor member of the front tongue surface; and
a cylindrical retention member extending from and disposed along the slidably removable clip, wherein when said cylindrical retention member slidably engages the clip attachment retention channel said slidably removable clip is retained in an extended position from said L-shaped base;
wherein when said front tongue surface of said slidably removable clip is flush against the back base surface of the L-shaped base said slidably removable clip is retained in a closed position; and
wherein when said slidably removable clip disengages said centrally disposed clip aperture, said slidably removable clip is in a removed position from said L-shaped base.

14. The apparatus of claim 13, further comprising an extruding air vent clip retention channel centrally disposed and formed along the back base surface of the L-shaped base adapted to slidably receive and retain at least two air vent clips when the slidably removable clip is in the removed position.

15. The apparatus of claim 13, wherein the adjustable elastic strap is hook and loop.

16. The apparatus of claim 13, wherein with the slidably removable clip in the extended position, said flexible triangular attachment clip is adapted for insertion and retention into a side window panel in a door of a vehicle.

17. The apparatus of claim 13, wherein with the slidably removable clip in the extended position, said flexible triangular attachment clip is adapted for attachment to an inside door handle of a door of a vehicle.

18. The apparatus of claim 13, wherein with the slidably removable clip in the extended position, said flexible triangular attachment clip is adapted for attachment to an armrest of a vehicle.

* * * * *